United States Patent
Li et al.

(10) Patent No.: US 7,916,412 B2
(45) Date of Patent: Mar. 29, 2011

(54) LENS DRIVING DEVICE

(75) Inventors: Yue Li, Hong Kong (CN); Guoji Zhang, Shenzhen (CN); Jian Zhao, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 37 days.

(21) Appl. No.: 12/396,276

(22) Filed: Mar. 2, 2009

(65) Prior Publication Data
US 2009/0219633 A1 Sep. 3, 2009

Related U.S. Application Data

(63) Continuation-in-part of application No. 11/723,338, filed on Mar. 19, 2007, now Pat. No. 7,549,597.

(30) Foreign Application Priority Data

Feb. 29, 2008 (CN) .......................... 2008 1 0065448
Feb. 29, 2008 (CN) .......................... 2008 1 0065449
May 30, 2008 (CN) .......................... 2008 1 0067542

(51) Int. Cl.
    G02B 7/02 (2006.01)
(52) U.S. Cl. ...................................... 359/824; 359/814
(58) Field of Classification Search .................... 359/824
    See application file for complete search history.

(56) References Cited

U.S. PATENT DOCUMENTS

2007/0047942 A1* 3/2007 Chang et al. .................. 396/133
* cited by examiner

*Primary Examiner* — Ricky L Mack
*Assistant Examiner* — James C Jones
(74) *Attorney, Agent, or Firm* — Muncy, Geissler, Olds & Lowe, PLLC (57) ABSTRACT

A lens driving device has a stationary part including an iron shell, a movable part including a lens holder for holding a lens therein, and a driving part for moving the movable part relative to the stationary part. The driving part includes a plurality of magnets fixed to the iron shell, and at least one coil fixed to the lens holder. The magnets are divided into at least two layers stacked in the direction of the optical axis of the lens and a plurality of groups along the circumferential direction of the lens. Each magnet is polarized in the radial direction of the lens. The polarities of two adjacent stacked magnetic poles in the same group are opposite to each other so as to cooperatively form a magnetic circuit in a plane parallel to the optical axis direction. The coil includes an axis about which the coil is wound. The coil axis is perpendicular to the optical axis. The coil has an upper part facing one layer of magnets and a lower part facing the other layer of magnets.

15 Claims, 9 Drawing Sheets

FIG. 15

LENS DRIVING DEVICE

CROSS REFERENCE TO RELATED APPLICATIONS

This non-provisional patent application claims priority under 35 U.S.C. §119(a) from Patent Application No. 200810065448.6 filed in The People's Republic of China on Feb. 29, 2008, from Patent Application No. 200810065449.0 filed in The People's Republic of China on Feb. 29, 2008 and from Patent Application No. 200810067542.5 filed in The People's Republic of China on May 30, 2008, the disclosures of which are incorporated herein by reference.

FIELD OF THE INVENTION

The present invention relates to photographing techniques and in particular to a lens driving device.

BACKGROUND OF THE INVENTION

Video digital products such as digital cameras, digital video cameras, cell phones with cameras, and computers with cameras have a movable lens for focusing an image to be captured. A known lens driving method uses a coil and a magnet to generate an electromagnetic force to move the lens along the optical axis of the lens.

Figure 1:
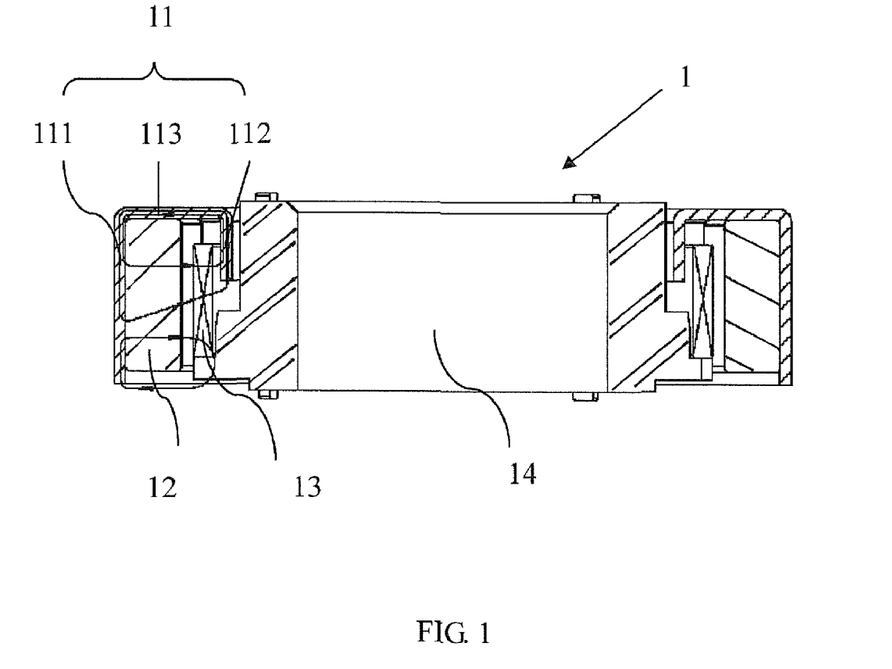
FIG. 1 is a sectional view of a known lens driving device.

FIG. 1 shows a sectional diagram of a lens driving device 1 in accordance with conventional art. Referring to FIG. 1, the lens driving device 1 comprises a yoke 11, a magnet 12, a coil 13 and a lens holder 14. The magnet 12 is fixed to an inner surface of the yoke 11 and the combination acts as a stationary part. The coil 13 is fixed to the outside of the lens holder 14 and the combination acts as a movable part. The yoke 11 comprises an outer ring 111, an inner ring 112, and a connecting part 113 connecting the outer ring 111 to the inner ring 112. The magnet 12 is fixed to the inner surface of the outer ring 111, and the coil 13 is located between the inner ring 112 and the outer ring 111 in the radial direction. The movable part is moved relative to the stationary part when the coil 13 is electrified.

The flow of magnetic flux of the magnet 12 is indicated by arrows in FIG. 1. The inner ring 112 of the yoke 11 is shorter than the outer ring 111 and the magnet 12 to allow the movable part to move. A comparatively large part of the magnetic flux produced by the magnet 12 which does not pass through the inner ring 112 will meet great magnetic reluctance, which results in the magnetic field intensity where the corresponding part of the coil is located being weak and the utilization ratio of the magnetic field is low.

SUMMARY OF THE INVENTION

The present invention aims to solve or mitigate the above-mentioned problems, or at least to provide a useful choice.

Accordingly, in one aspect thereof, the present invention provides a lens driving device, comprising: a stationary part comprising an iron shell, a movable part comprising a lens holder configured for holding lens therein, and a driving part configured for driving the movable part to move relative to the stationary part, the driving part comprising magnet means providing a plurality of magnetic poles fixed to one of the iron shell and the lens holder, and at least one coil fixed to the other one of the iron shell and the lens holder, the magnetic poles being divided into at least two layers stacked along optical axis direction of the lens and a plurality of groups arranged in the circumferential direction of the lens, the magnet means being polarized along the radial direction of the lens, the polarities of two adjacent magnetic poles in the same group being opposite to each other so as to cooperatively form a magnetic circuit in a plane parallel to the optical axis direction, the coil having an axis around which the coil is wound, the coil axis being perpendicular to the optical axis direction, an upper part facing one layer of magnetic poles and a lower part facing the other layer of magnetic poles, the upper and lower parts of the coil being disposed at opposite sides of the axis of the coil.

Preferably, each layer of magnetic poles forms 2*N magnetic poles cooperatively forming multiple magnetic circuits in a plane perpendicular to the optical axis, wherein N is an integer greater than or equal to 1.

Preferably, the polarity of each magnetic pole is opposite to that of two adjacent magnetic poles in the same layer, and the driving part comprises 2*N coils, each coil corresponding to a group of magnetic poles, directions of currents flowing through two adjacent coils are opposite to each other.

Preferably, the magnetic poles are divided into four groups along the circumferential direction, and the driving part comprises four coils respectively corresponding to the four groups of magnetic poles.

Preferably, the magnetic poles are divided into four groups along the circumferential direction, the polarity of each magnetic pole is opposite to that of one of the two adjacent magnetic poles in the same layer and is the same as that of the other of the two adjacent magnetic poles in the same layer.

Preferably, the driving part comprises two coils each corresponding to two groups of magnetic poles having the same polarity, and directions of currents flowing through the two coils are opposite to each other.

Preferably, the magnetic poles are divided into two groups along the circumferential direction, and the driving part comprises two coils respectively corresponding to the two groups of magnetic poles.

Preferably, the magnetic poles in the same layer have the same polarity, and the driving part comprise a single coil corresponding to all the magnetic poles.

Preferably, the magnetic poles in the same layer have the same polarity, the magnetic poles are divided into 2*N groups, and the driving part comprises 2*N coils each corresponding to one group of magnetic poles, wherein N is an integer greater than or equal to 1.

Preferably, the magnetic poles in the same layer have the same polarity, the magnetic poles are divided into 2*N groups, and the driving part comprise N coils each corresponding to two groups of magnetic poles, wherein N is an integer greater than or equal to 1.

Preferably, the movable part is located inside the stationary part, the magnet means are fixed to an inside surface of the iron shell, and the coils are fixed to an outer surface of the lens holder.

Preferably, the coils are formed into an arc shape before being fixed to the lens holder.

Preferably, the coils are fixed to the outer surface of the lens holder by adhesive.

Preferably, wherein the magnetic poles in each group are integrally formed as a single monolithic magnet.

Preferably, the magnetic poles in the same layer have the same polarity.

BRIEF DESCRIPTION OF THE DRAWINGS

A preferred embodiment of the invention will now be described, by way of example only, with reference to figures of the accompanying drawings, in which.

Dimensions of components and features shown in the figures are generally chosen for convenience and clarity of presentation and are not necessarily shown to scale.

DESCRIPTION OF THE PREFERRED EMBODIMENT

A lens driving device in accordance with embodiments of the present invention comprises a stationary part, a movable part, and a driving part arranged to move the movable part relative to the stationary part. The driving part comprises a plurality of magnets fixed to one of the stationary part and the movable part, and one or more coils facing the magnets fixed to the other of the stationary part and the movable part. For ease of description, in the following embodiments the magnets are fixed to the stationary part and the coils are fixed to the movable part on which a lens set is installed. It is to be understood that the positional relationship between the magnets and the coils in the present invention is not limited to that arrangement. As will be appreciated, while in some embodiments the device will be described with reference to a number of magnets, this is for ease of describing and understanding the invention, whereas it is the number and location of the magnetic poles of the magnets or magnet means which is of concern.

Figure 2:
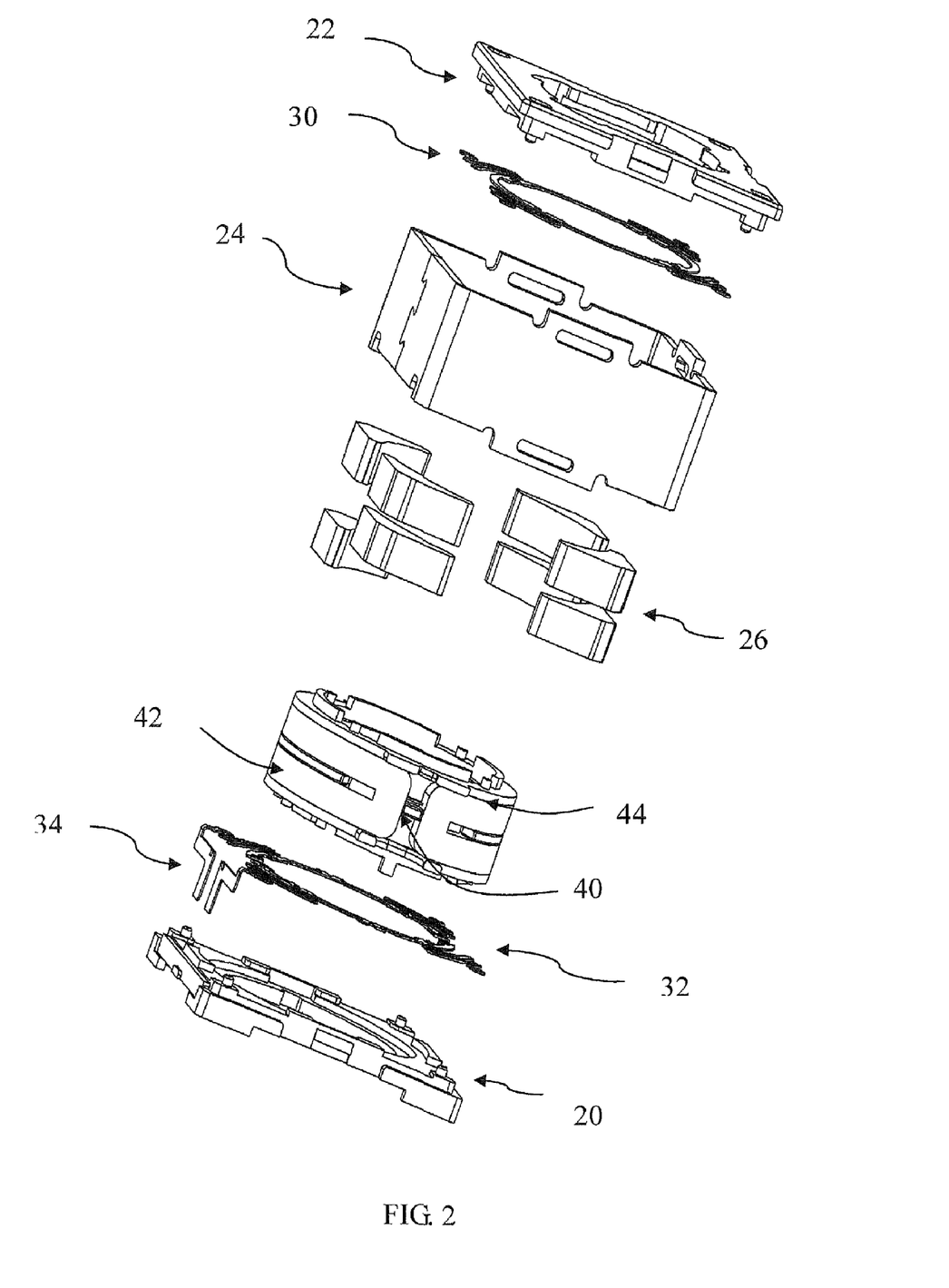
FIG. 2 is an exploded view of a lens driving device in accordance with a first embodiment of the present invention.

Referring to the embodiment of FIG. 2, the stationary part comprises a base 20, an upper cover 22, and an iron shell 24 fixed between the base 20 and the upper cover 22. The movable part comprises a lens holder 40 adapted to support the lens. The driving part comprises a plurality of magnets 26 fixed to an inner surface of the iron shell 24 and two coils 42, 44 fixed at diametrically opposite locations on an outer surface of the lens holder 40. The two coils substantially surround the lens holder. Two spring sets 30, 32, support the lens holder 40. Spring set 32 also electrically connects the coils 42, 44, to terminals 34.

Figure 3:
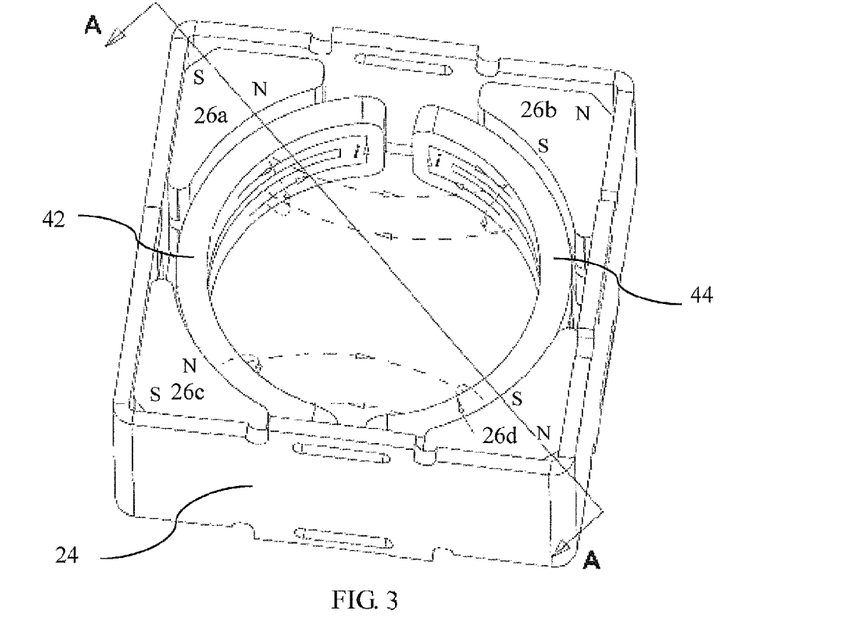
FIG. 3 is a diagrammatic view showing a position relation between the iron shell, magnets and coil of the lens driving device of FIG. 2.
Figure 4:
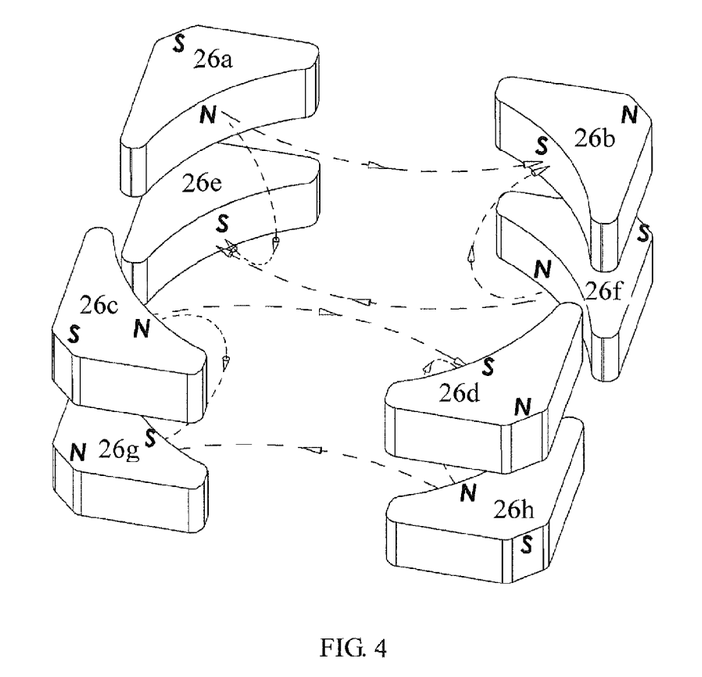
FIG. 4 is a diagrammatic view showing the magnetic flux path of the magnets of the lens driving device of FIG. 2.

As shown in FIG. 3 and FIG. 4, the magnets 26 comprises eight magnets 26a~26h divided into two layers stacked in the axial direction of the optical axis of the lens and divided into four groups in the circumferential direction of the lens, for example, the magnets 26a~26d form the upper layer, and the magnets 26e~26h form the lower layer; the magnet 26a and the magnet 26e are located in the same group; the magnet 26b and the magnet 26f are located in the same group; the magnet 26c and the magnet 26g are located in the same group; the magnet 26d and the magnet 26h are located in the same group. The cross section of the iron shell 24 is rectangular, and each group of magnets is fixed at a respective corner of the iron shell 24. Each magnet is polarized along the radial direction of the lens. The polarity of each magnet is opposite to that of the magnet of one of the two adjacent groups in the same layer while it is the same as the magnet of the other one of the two adjacent groups in the same layer. The magnets in the same group located in adjacent (stacked) layers have opposite polarities. For example, the polarity of the magnet 26a is opposite to that of the magnet 26b, the same as that of the magnet 26c, and opposite to that of the magnet 26e.

Figure 5:
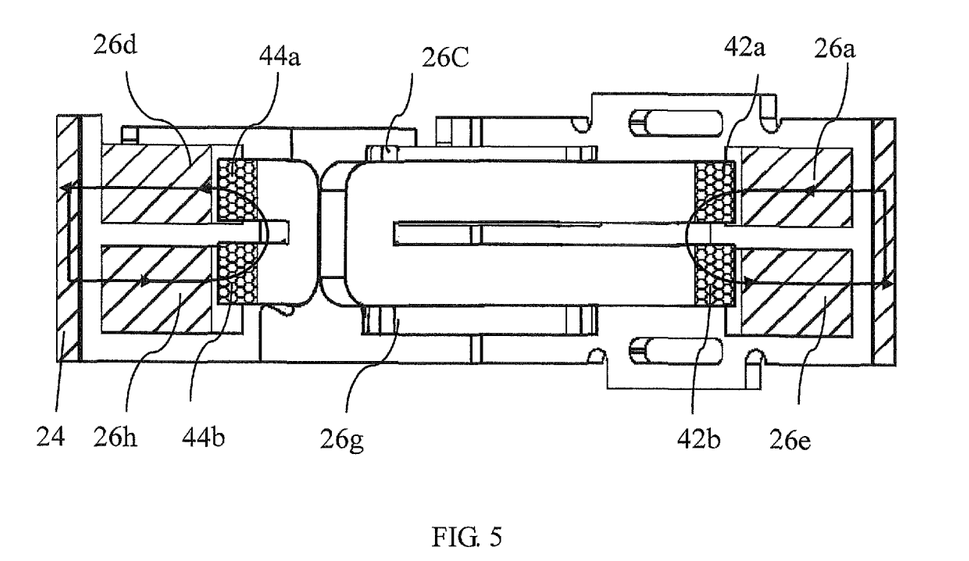
FIG. 5 is a cross sectional view taken along the line A-A of FIG. 3.
Figure 6:
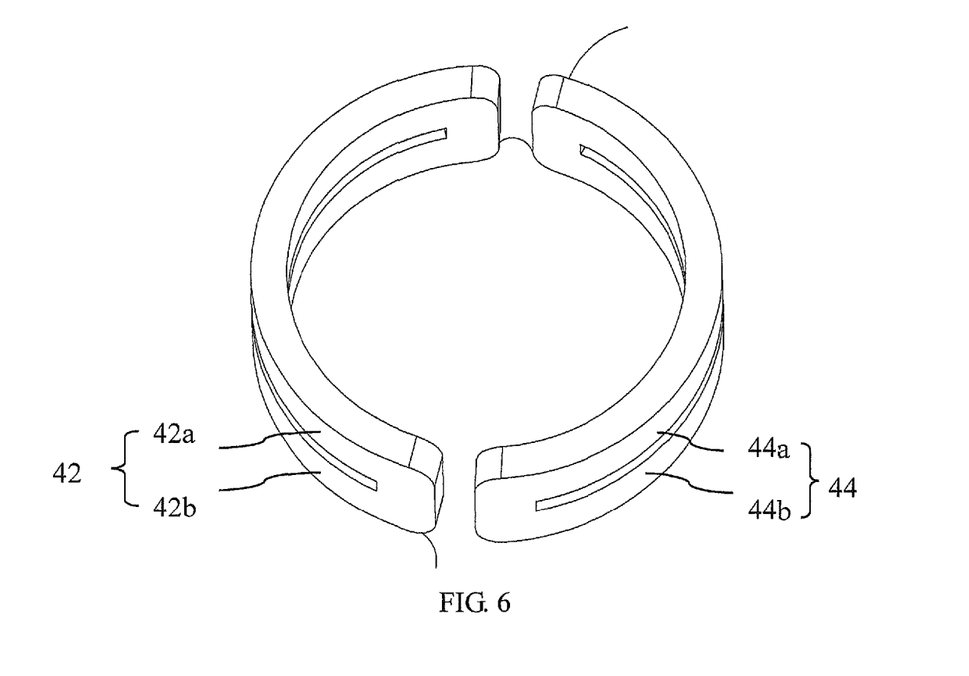
FIG. 6 is an isometric view of the coil of FIG. 2.

Each coil faces two groups of magnets having the same polarization, for example, the coil 42 faces the magnets 26a, 26e in the same group and magnets 26c, 26g in the same group, and the coil 44 faces the magnets 26b, 26f in the same group and magnets 26d, 26h in the same group. The axes about which the coils 42, 44 are wound, are perpendicular to the optical axis direction, i.e., the axes generally lay in a plane perpendicular to the optical axis. Current i flows through the two coils 42, 44 in opposite directions, that is, viewed from the center of the lens to the two coils, one flows in a clockwise direction and the other flows in a counterclockwise direction. As shown by the arrows in FIG. 3, the current i flows through the coil 44 in a clockwise direction, and the current i flows through the coil 42 in a counterclockwise direction. As shown in FIG. 5 and FIG. 6, each coil comprises an upper half part corresponding to the upper layer of magnets, and a lower half part corresponding to the lower layer of magnets, for example, the upper half part 42a of the coil 42 corresponds to the magnets 26a, 26c, and the lower half part 42b of the coil 42 corresponds to the magnets 26e, 26g; the upper half part 44a of the coil 44 corresponds to the magnets 26b, 26d, and the lower half part 44b corresponds to the magnets 26f, 26h.

The magnetic flux directions of the above mentioned magnets 26a~26h are shown as dotted-line arrows in FIG. 3 and FIG. 4. In the upper layer of magnets 26a~26d, the magnetic flux emitted from the north pole N of the magnet 26a in turn passes through the air gap between the magnet 26a and the upper half part 42a of the coil 42, the upper half part 42a of the coil 42, the upper half part 44a of the coil 44, the air gap between the magnet 26b and the coil 44, and then to the south pole S of the magnet 26b in the adjacent group, and finally returns to the south pole S of the magnet 26a via the iron shell 24. In the same way, the magnetic flux emitted from the north pole N of the magnet 26c in turn passes through the air gap between the magnet 26c and the upper half part 42a of the coil 42, the upper half part 42a of the coil 42, the upper half part 44a of the coil 44, the air gap between the magnet 26d and the coil 44, and then to the south pole S of the magnet 26d, and finally returns to the south pole S of the magnet 26c via the iron shell 24. It is to be understood that, the magnet flux of the lower layer of magnets is basically the same as that of the upper layer of magnets, and will not be further described here. Thus, in each layer of magnets, i.e., in a plane perpendicular to the optical axis, two adjacent magnets with opposite polarity cooperatively form a magnetic circuit passing through the two coils.

In the same group of magnets, for example, in the group comprising the magnet 26a and magnet 26e, the magnetic flux produced by the magnet 26a starts from the North pole N, in turn passes through the air gap between the magnet 26a and the coil 42, the upper half part 42a of the coil 42, the lower half part 42b of the coil 42, the air gap between the magnet 26e and the coil 42, and then to the south pole S of the magnet 26e in the lower layer of the same group, and finally returns to the south pole S of the magnet 26a via the iron shell 24. Thus, in each group of magnets, the two stacked magnets, having opposite poles, cooperatively form a magnetic circuit. According to the left-hand rule, ampere forces with the same direction will be generated at the upper and lower parts of the coils 42, 44 when the coils 42, 44 are electrified, thereby driving the lens holder together with lens installed therein to move back and forth along the optical axis direction.

In the above mentioned embodiment, magnetic circuits are formed in magnets with different poles in the same layer, and other magnetic circuits are formed in magnets with different poles in the same group. Thus, each coil is disposed in multiple magnetic circuits at the same time. Therefore, the intensity of the magnetic field in which the coil is located is greatly enhanced, the magnetic leakage is reduced, thus EMI is improved and the utilization ratio of the magnetic field is increased.

In the above mentioned embodiment, the coils 42, 44 are firstly wound around a winding axis to form a rectangular coil, and then the rectangular coils are bent to form an arc configuration (as shown in FIG. 6), and finally, the arc shaped coils 42, 44 are fixed to the outer surface of the lens holder 40 at opposite sides thereof, by means of adhesive etc.

In the embodiment described above, in each layer of magnets, two adjacent magnets having the same polarity may be integrally formed as a single magnet, for example, in the upper layer of magnets, the magnet 26a and the magnet 26c can be integrated as a single magnet, and the magnet 26b and the magnet 26d can be integrated as a single magnet; in the lower layer magnets, the magnet 26e and the magnet 26g can be integrated as a single magnet, and the magnet 26f and the magnet 26h can be integrated as a single magnet.

FIGS. 7-10, illustrate another embodiment of the present invention, in which the polarity of each magnet is opposite to that of two adjacent magnets in the same layer, for example, the polarity of the magnet 26a' is opposite to that of the magnets 26b' & 26c', and the polarity of the magnet 26d' is opposite to that of the magnets 26b' & 26c'; the polarity of the magnet 26e' is opposite to that of the magnets 26f' & 26g', and the polarity of the magnet 26h' is opposite to that of the magnets 26f' & 26g'. The polarities of the two adjacent magnets located in the same group are opposite to each other. The driving part comprises four coils 42', 44', 46', 48', and each coil corresponds to a group of magnets. Directions of currents i flowing through adjacent coils are opposite to each other.

Figure 7:
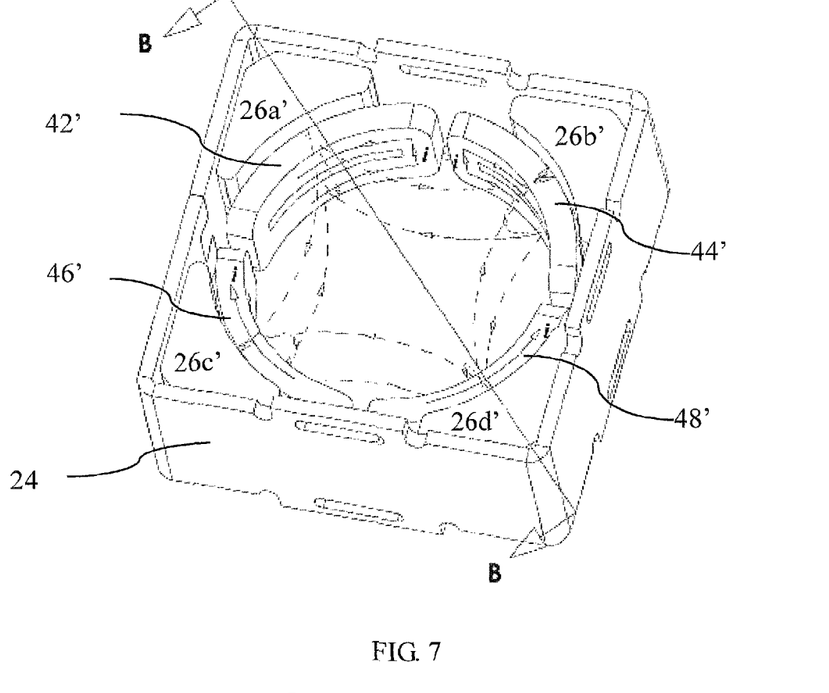
FIG. 7 is a diagrammatic view showing a position relation between iron shell, magnets and coil of a lens driving device in accordance with a second embodiment of the present invention.
Figure 8:
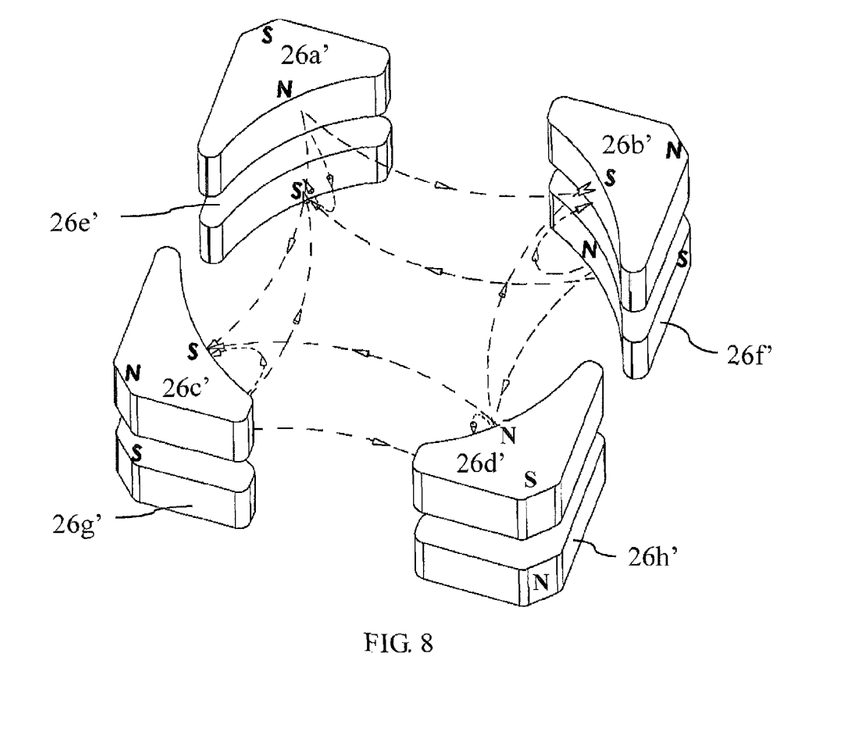
FIG. 8 is a diagrammatic view showing the magnetic flux path of the magnets of the lens driving device of FIG. 7.

In the upper layer of magnets 26a'~26d', the magnetic flux produced by the magnet 26a' emitted from the north pole N thereof, passes through the air gap between the magnet 26a' and the upper half part 42a' of one coil 42', the upper half part 42a' of the coil 42'. One part of the magnetic flux passing through the upper half part 42a' of the coil 42' continues to pass through the upper half part 44a' of an adjacent coil 44', the air gap between the upper half part 44a' of the coil 44' and the magnet 26b', and then to the south pole S of the magnet 26b', and finally returns to the south pole S of the magnet 26a' via the iron shell 24. The other part of the magnetic flux passing through the upper half part 42a' of the coil 42' passes through the upper half part 46a' of the other adjacent coil 46', the air gap between the upper half part 46a' of the coil 46' and the magnet 26c', to the south pole S of the magnet 26c', and finally returns to the south pole S of the magnet 26a' via the iron shell 24. Thus, in the upper layer of magnets, two magnetic circuits are respectively formed between the magnet 26a' and two adjacent magnets 26b', 26c' the poles of which are opposite to that of the magnet 26a'. Understandably, in the upper layer of magnets, other two magnetic circuits can also be respectively formed between the magnet 26d' and the two adjacent magnets 26b', 26c' the poles of which are opposite to that of the magnet 26d'. Thus, in each layer of magnets, two adjacent magnets having opposite polarity cooperatively form a magnetic circuit passing through the upper and lower parts of a corresponding coil in turn. Therefore, each magnet forms two magnetic circuits together with two adjacent magnets in the same layer, and forms a third magnetic circuit together with the stacked magnet in the same group. Hence, as each coil is located in three magnetic circuits at the same time, the intensity of the magnetic field in which the coil is located is greatly enhanced, and the magnetic leakage is reduced which results in improved EMI and the utilization ratio of the magnetic field is increased.

It is to be understood that, in the above mentioned embodiments of the present invention, the cross section of the iron shell 24 can be rectangular, circle or any other suitable shape, and the cross section of the lens holder 40 can be rectangular, circle or other shapes. The number of magnetic poles of the magnets in the same layer is not limited to the situations described above, and the number of magnetic poles of the magnets in the same layer can be 2*N, wherein N is an integer greater than or equal to 1, i.e. the number of poles may be: 2, 4, 6, 8, 10, etc. In the present invention, the number of magnetic poles of the magnets in the same layer is equal to the number of times the magnetic pole changes between adjacent magnets in the same layer. In the same layer two adjacent magnets with the same pole will be called as one magnetic pole. For example, the magnets located in the same layer as shown in FIGS. 3 and 4 form two magnetic poles. The magnets in the same layer as shown in FIGS. 7 and 8 form four magnetic poles.

Figure 9:
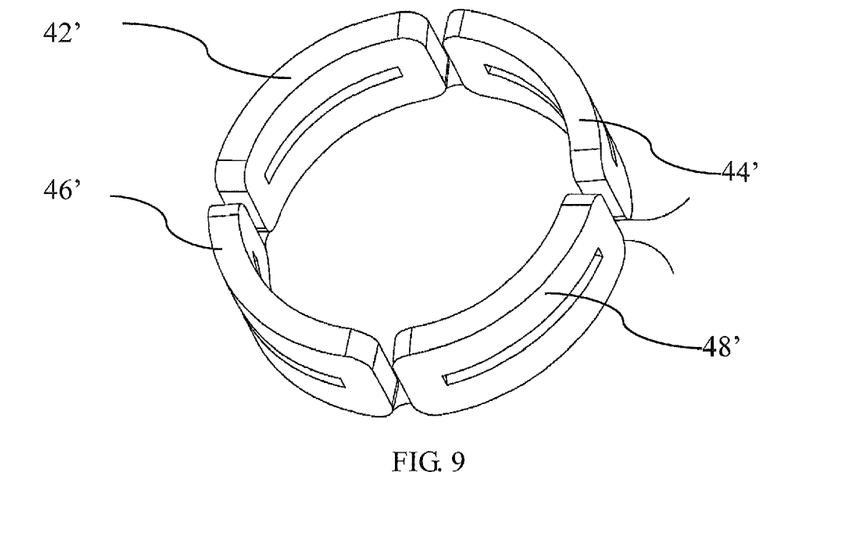
FIG. 9 is an isometric view of the coil of FIG. 7.
Figure 10:
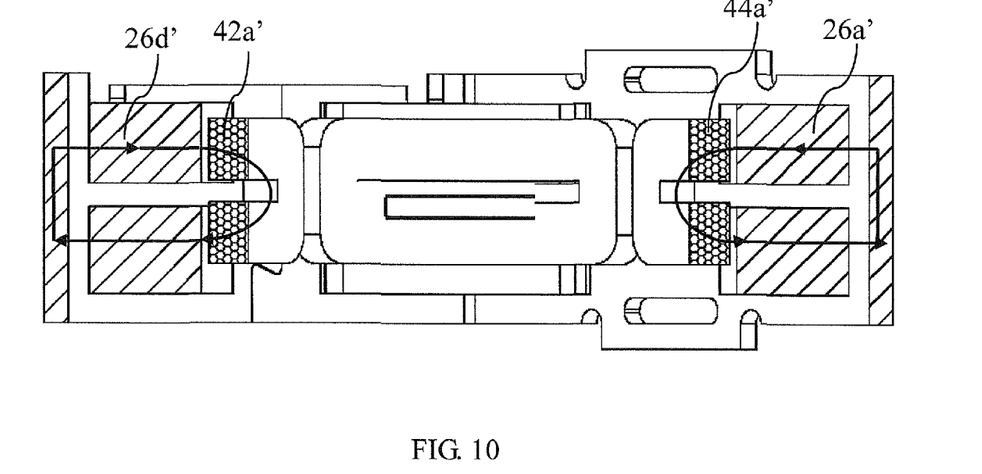
FIG. 10 is a cross sectional view taken along line B-B of FIG. 7.
Figure 11:
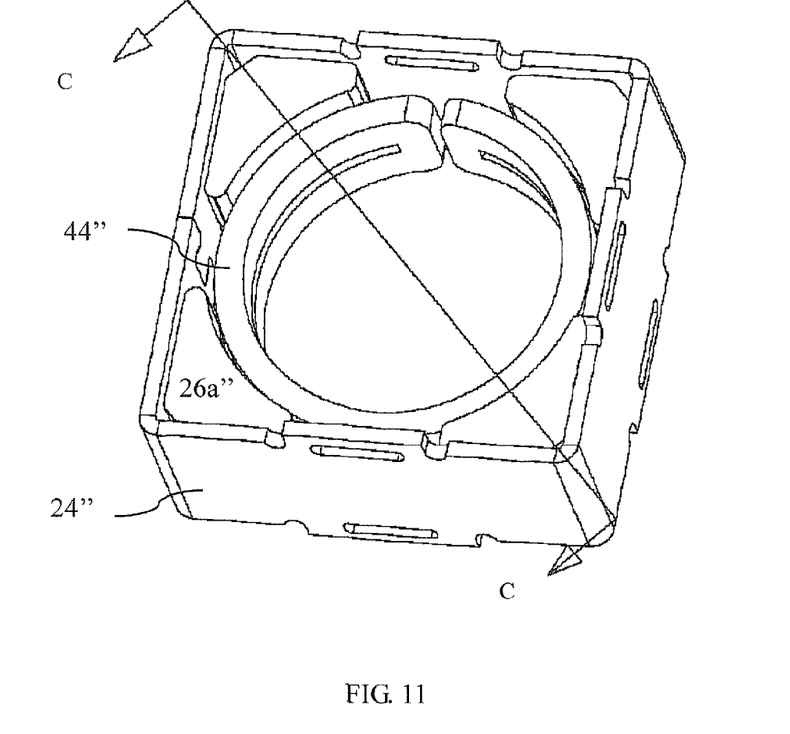
FIG. 11 is a diagrammatic view showing a position relation between the iron shell, magnets and coil of the lens driving device in accordance with an alternative embodiment of the present invention.
Figure 12:
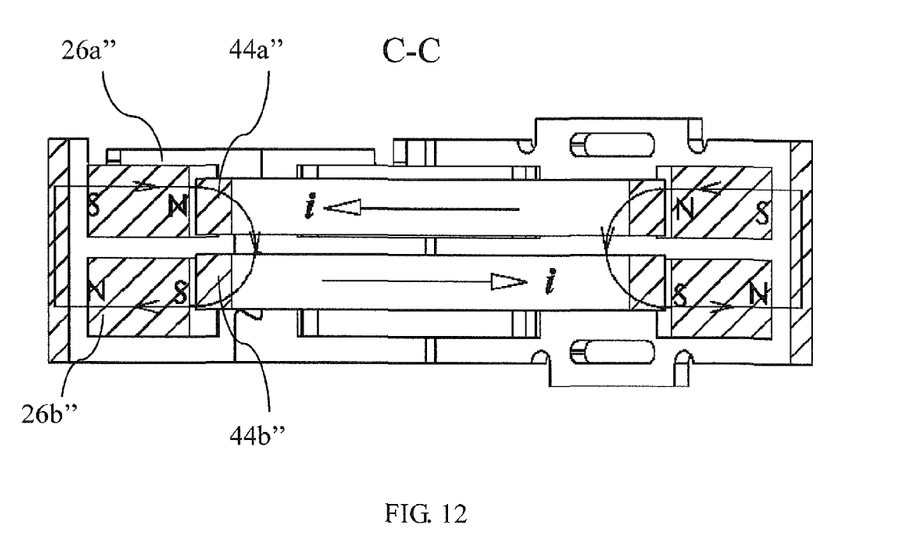
FIG. 12 is a cross section view taken along line C-C of FIG. 11.
Figure 13:
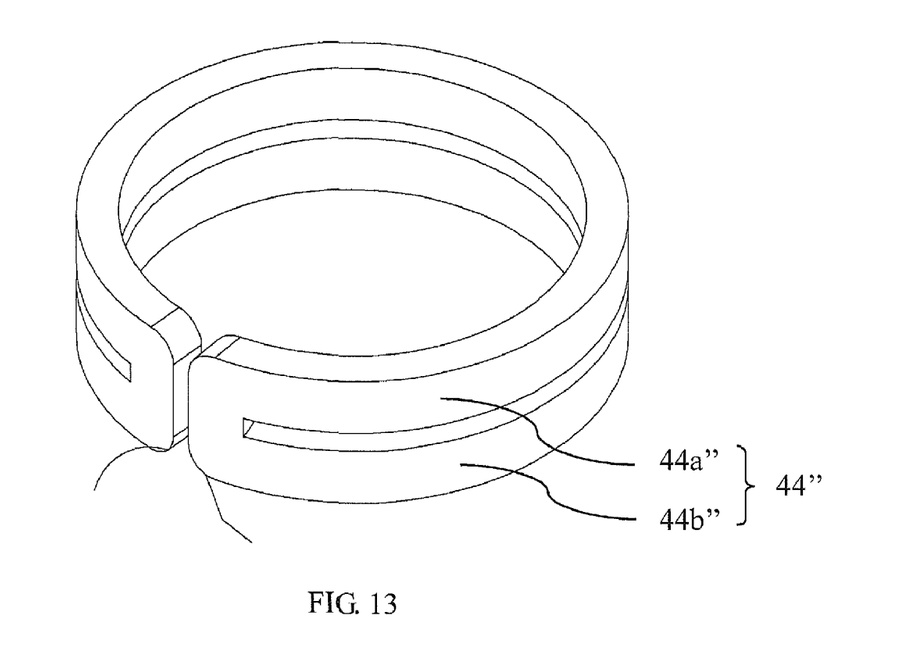
FIG. 13 is an isometric view of the coil of FIG. 11.
Figure 14:
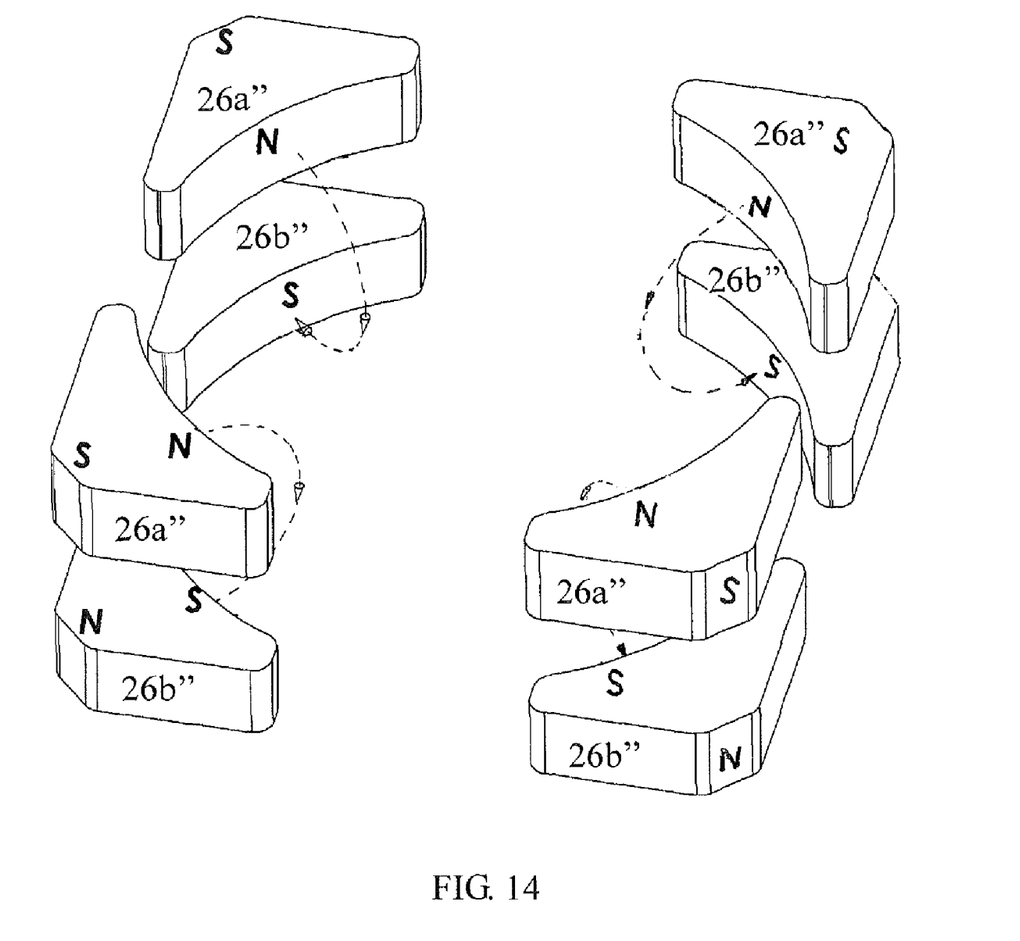
FIG. 14 is a schematic view of the magnets of the device of FIG. 11.

FIGS. 11-14 show a lens driving device in accordance with an alternative embodiment of the present invention. The lens driving device of the alternative embodiment is similar to the lens driving device describe above except for the pole of the magnets and the coil. In this embodiment, the magnets in the same layer have the same poles, i.e., all magnets 26a" in the upper layer have the same poles while all magnets 26b" in the lower layer have the same poles. Stacked magnets in the same group have opposite poles, i.e., in each group the poles of the magnet 26a" in the upper layer and the magnet 26b" in the lower layer are opposite to each other. The layout of the magnets is shown in FIG. 14. The coil 44" has a substantially circular configure. The axis of the coil 44" around which the coil is wound, is perpendicular to the optical axis direction. The coil is formed as a rectangular coil which is then bent, curved or arced to suit the lens holder. The coil 44" comprises an upper part 44a" facing the upper layer of magnets 26a" and a lower part 44b" facing the lower layer of magnets 26b". The two stacked magnets in the same group cooperatively form a magnetic circuit passing through the upper and lower part of the coils 44" and the iron core 24". Since the current i flows through the upper and lower parts of the coils 44" in opposite directions when viewed in the radial direction of the lens, force generated at the upper and lower parts of the coils 44" has the same direction. Thus, when the coil 44" is electrified, electromagnetic force will be generated on the coil which is fixed to the outer surface of the lens holder, thereby driving the lens holder together with lens installed therein to move back and forth along the optical axis direction. Alternatively, the coil may consist of two semi-circular coils as shown in FIG. 6, or consist of four arcuate coils as shown in FIG. 9.

In all the above-described embodiments, two stacked magnets in each group cooperatively form a magnetic circuit passing through the upper and lower parts of corresponding coil(s). The magnetic circuit of the present invention has smaller magnetic reluctance compared with the magnetic circuit without passing through the inner yoke of the prior art as shown in FIG. 1. The magnetic field intensity is therefore increased. Understandably, the present invention is not limited to two layers of magnets. According to design requirement, three or four or other layers of magnets may be used.

Figure 15:
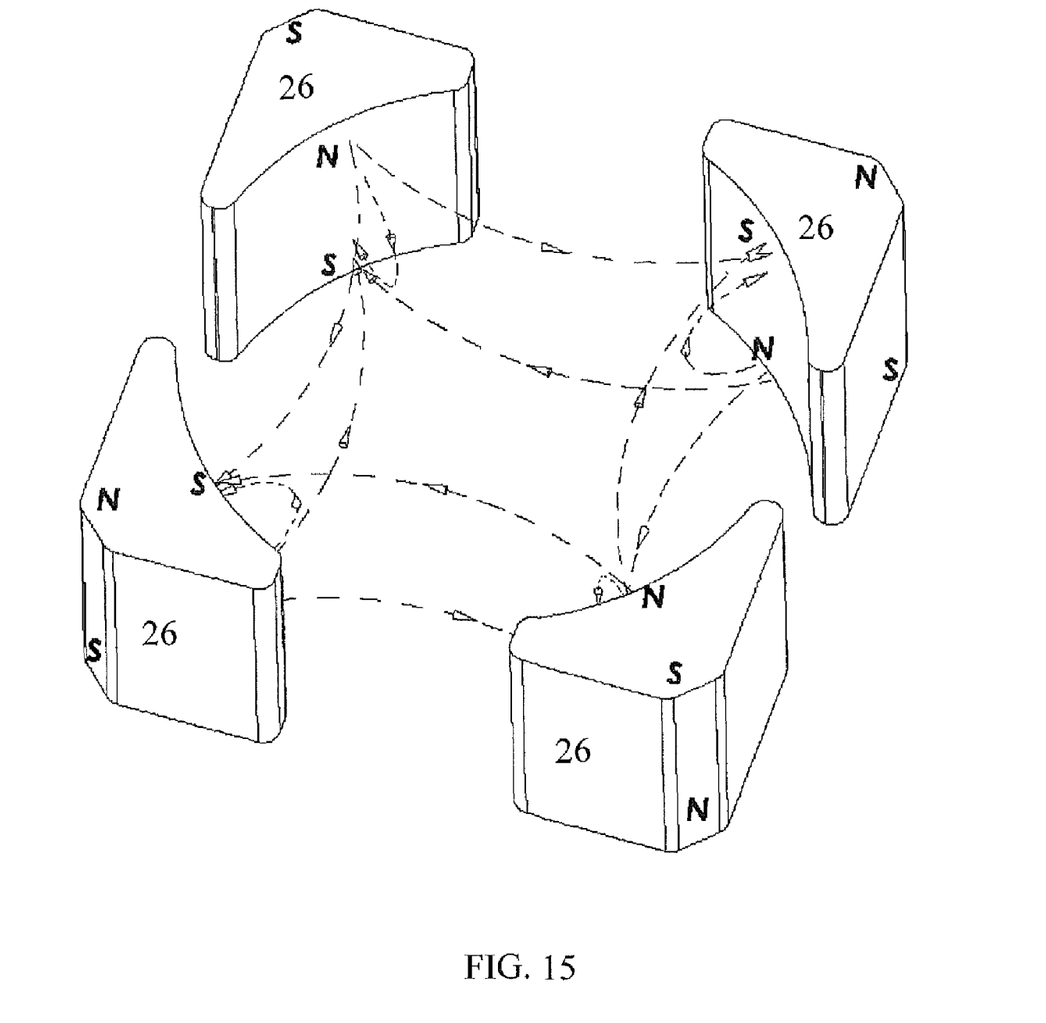
FIG. 15 is a diagrammatic view of magnets according to yet another embodiment of the present invention.

In the above described embodiments, the groups of stacked magnetic poles have been formed using discrete or separate magnets. As shown in FIG. 15, the groups of magnetic poles could be formed using a single magnet which has been appropriately magnetised. Thus, in each group of magnets, two stacked magnetic poles are formed in a single magnet and thus each group is formed by a single magnet. FIG. 15 shows, as an example, the configuration as appropriate to implement the equivalent magnetic circuit for the embodiment of FIG. 8. By combining the two ideas above, a single ring magnet or two part-circular magnets could be magnetised to provide the equivalent magnetic circuits. However, the separate magnets are preferred to give more precise control.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

What is claimed is:

1. A lens driving device, comprising:
   a stationary part comprising an iron shell,
   a movable part comprising a lens holder configured for holding lens therein, and
   a driving part configured for driving the movable part to move relative to the stationary part, the driving part comprising magnet means providing a plurality of magnetic poles fixed to one of the iron shell and the lens holder, and at least one coil fixed to the other one of the iron shell and the lens holder, the magnetic poles being divided into at least two layers stacked along optical axis direction of the lens and a plurality of groups arranged in the circumferential direction of the lens, the magnet means being polarized along the radial direction of the lens, the polarities of two stacked magnetic poles in the same group being opposite to each other so as to cooperatively form a magnetic circuit in a plane parallel to the optical axis direction, the coil having an axis around which the coil is wound, the coil axis being perpendicular to the optical axis direction, an upper part facing one layer of magnetic poles and a lower part facing the other layer of magnetic poles, the upper and lower parts of the coil being disposed at opposite sides of the axis of the coil.

2. The lens driving device of claim 1, wherein each layer of magnetic poles forms 2*N magnetic poles cooperatively forming multiple magnetic circuits in a plane perpendicular to the optical axis, wherein N is an integer greater than or equal to 1.

3. The lens driving device of claim 2, wherein the polarity of each magnetic pole is opposite to that of two adjacent magnetic poles in the same layer, and the driving part comprises 2*N coils, each coil corresponding to a group of magnetic poles, directions of currents flowing through two adjacent coils are opposite to each other.

4. The lens driving device of claim 3, wherein the magnetic poles are divided into four groups along the circumferential direction, and the driving part comprises four coils respectively corresponding to the four groups of magnetic poles.

5. The lens driving device of claim 2, wherein the magnetic poles are divided into four groups along the circumferential direction, the polarity of each magnetic pole is opposite to that of one of the two adjacent magnetic poles in the same layer and is the same as that of the other of the two adjacent magnetic poles in the same layer.

6. The lens driving device of claim 5, wherein the driving part comprises two coils each corresponding to two groups of magnetic poles having the same polarity, and directions of currents flowing through the two coils are opposite to each other.

7. The lens driving device of claim 2, wherein the magnetic poles are divided into two groups along the circumferential direction, and the driving part comprises two coils respectively corresponding to the two groups of magnetic poles.

8. The lens driving device of claim 1, wherein the magnetic poles in the same layer have the same polarity, and the driving part comprise a single coil corresponding to all the magnetic poles.

9. The lens driving device of claim 1, wherein the magnetic poles in the same layer have the same polarity, the magnetic poles are divided into 2*N groups, and the driving part comprises 2*N coils each corresponding to one group of magnetic poles, wherein N is an integer greater than or equal to 1.

10. The lens driving device of claim 1, wherein the magnetic poles in the same layer have the same polarity, the magnetic poles are divided into 2*N groups, and the driving part comprise N coils each corresponding to two groups of magnetic poles, wherein N is an integer greater than or equal to 1.

11. The lens driving device of claim 1, wherein the movable part is located inside the stationary part, the magnet means are fixed to an inside surface of the iron shell, and the coils are fixed to an outer surface of the lens holder.

12. The lens driving device of claim 11, wherein the coils are formed into an arc shape before being fixed to the lens holder.

13. The lens driving device of claim 12, wherein the coils are fixed to the outer surface of the lens holder by adhesive.

14. The lens driving device of claim 1, wherein the magnetic poles in each group are integrally formed as a single monolithic magnet.

15. The lens driving device of claim 1, wherein the magnetic poles in the same layer have the same polarity.

* * * * *